United States Patent [19]

Harris et al.

[11] 3,959,499

[45] May 25, 1976

[54] LEAVENING COMPOSITION AND STORAGE STABLE CAKE MIXES MADE THEREWITH

[75] Inventors: Norman E. Harris, Waltham; Henry G. Russell, Hudson, both of Mass.

[73] Assignee: The United States of America as represented by the Secretary of the Army, Washington, D.C.

[22] Filed: Dec. 23, 1974

[21] Appl. No.: 535,323

[52] U.S. Cl.................................. 426/97; 426/302; 426/554; 426/555; 426/562
[51] Int. Cl.².......................................... A21D 10/00
[58] Field of Search................. 426/89, 96, 97, 103, 426/153, 156, 160, 213, 225, 226, 345, 139, 561, 554, 562, 555, 563; 106/197 R, 203

[56] References Cited
UNITED STATES PATENTS

| | | | |
|---|---|---|---|
| 2,996,384 | 8/1961 | Elsesser | 426/156 |
| 3,041,177 | 6/1962 | Lauck et al. | 426/563 |
| 3,052,549 | 9/1962 | Kiehline et al. | 426/153 |
| 3,632,355 | 1/1972 | Umina | 426/345 |

*Primary Examiner*—Raymond N. Jones
*Attorney, Agent, or Firm*—Nathan Edelberg; Robert P. Gibson; Charles C. Rainey

[57] ABSTRACT

Method of making a storage stable cake mix; a leavening agent coating composition for preventing premature reaction of the sodium bicarbonate leavening agent with the acidic leavening agent when both types of leavening agent are to be mixed with the other components of a cake mix; and the leavening composition comprising the coated sodium bicarbonate.

8 Claims, No Drawings

LEAVENING COMPOSITION AND STORAGE STABLE CAKE MIXES MADE THEREWITH

The invention described herein may be manufactured, used, and licensed by or for the Government for governmental purposes without the payment to us of any royalty thereon.

BACKGROUND OF THE INVENTION

This invention relates to a method of making a cake mix which is storage stable so that cakes of high specific volume and exhibiting high acceptability characteristics may be prepared therefrom. The invention also relates to a leavening agent coating composition for preventing premature reaction of the sodium bicarbonate leavening agent with the acidic leavening agent when both types of leavening agent are mixed with the other components of a cake mix, and to the leavening composition.

In the production of cake mixes, it has been customary to incorporate sodium bicarbonate and an acid-type leavening agent with the oter components of the cake mix and to keep the moisture content of the cake mix low enough to prevent or to minimize reaction of the sodium bicarbonate leavening agent with the acidic leavening agent sufficiently to permit the preparation of batters from the cake mixes which will rise well and produce cakes of good specific volumes and texture. Various expedients have been tried to avoid premature release of carbon dioxide from the sodium bicarbonate. However, none of these has proven sufficiently effective to enable storing of complete cake mixes at relatively high temperatures, such as up to 100°F., for long storage times, such as six months or more, without incurring rather large losses of carbon dioxide while in storage. The result of such poor storage stability of conventional cake mixes has been the production of cakes having unacceptably low specific volumes from cake mixes prepared conventionally and stored at a temperature of, or approaching, 100°F. for several months prior to making cakes therefrom. This has been a particularly difficult problem for the Armed Forces because of the high temperatures encountered in some storage facilities as well as during shipment and because of the long times which elapse between the manufacture of cake mixes and the use thereof in the field espcially at remote points in the field.

In order to avoid premature reaction of the sodium bicarbonate with the acidic leavening agent of cake mixes, the Armed Forces adopted a procedure whereby the sodium bicarbonate, instead of being mixed with the other ingredients of the cake mix prior to storage, is sealed in a packet which has an extremely low rate of transmission of moisture. A packet of sodium bicarbonate in the quantity needed for making a cake out of the cake mix is inclosed in the container in which the cake mix is sealed. However, this procedure results in certain problems in the use of the cake mixes in the field, particularly in obtaining thorough mixing of the sodium bicarbonate with the other ingredients of the cake mix before preparing a cake better therefrom and baking a cake.

An object of the present invention is to provide a method of making a cake mix which is highly storage stable and capable of producing a baked cake of high specific volume after storage of the cake mix at temperatues as high as 100°F. and for times of as long as six months.

Another object is to provide a leavening agent coating composition which, when applied as a coating to particles of sodium bicarbonate and dried, substantially prevents reaction of the sodium bicarbonate with the acidic-type leavening agent in the cake mix while it is in storage and prior to the deliberate mixing of water with the cake mix for the purpose of preparing a cake therefrom.

A further object is to provide a leavening composition for incorporation in a cake mix to improve the storage stability thereof.

Other objects and advantages will appear from the following description, and the novel features will be particularly point out in connection with the appended claims.

SUMMARY OF THE INVENTION

The invention involves the application of a coating to sodium bicarbonate wich protects the sodium bicarbonate against reaction to release carbon dioxide when the coated sodium bicarbonate is incorporated in a cake mix and is thoroughly mixed with the other ingredients of the cake mix. The coating composition for the sodium bicarbonate comprises a mixture of certain cellulose ethers and a solvent therefor. The solvent is removed following coating of the sodium bicarbonate, resulting in the leavening composition which resists reacting with the acidic leavening agent prior to the preparation of a cake batter from the cake mix and the baking of a cake therefrom.

DESCRIPTION OF THE PREFERRED EMBODIMENTS

It is to be understood that percentage or ratios stated hereinafter and in the claims refer to percentages or ratios by weight unless otherwise indicated.

The hydroxypropylmethylcellulose employed in the coating composition is characterized by having from about 4 to about 12 percent of 2-hydroxypropyl groups and from about 19 to about 30 percent of methoxyl groups therein. It is described in the "Food Chemicals Codex", First Edition, 1966, Publication 1406 of The National Academy of Sciences — National Research Council, Washington, D.C., at pages 335–6. It is preferred that the hydroxypropylmethylcellulose having a viscosity of from about 40 to about 60 centipoises, determined in accordance with A.S.T.M. Standard D2363-72.

The methylcellulose employed in the coating composition is characterized by having from about 27.5 to about 31.5 percent of methoxyl groups therein. It is described in the above referred to "Food Chemicals Codex" at pages 432–3. It is preferred that the methylcellulose have a viscosity of from about 15 to about 100 centipoises, determined in accordane with A.S.T.M. Standard D1347-72.

The ethylcellulose employed in the coating composition is characterized by having from about 45.0 to about 49.5 percent of ethoxyl groups therein. It is described in the above referred to "Food Chemicals Codes" at pages 254–5. It is preferred that the ethylcellulose have a viscosity of from about 7 to about 100 centipoises, determined in accordance with A.S.T.M. Standard D914-72.

The coating composition for leavening agents comprises a mixture of (1) a cellulose ether which may be either hydroxypropylmethylcellulose, as defined above, or methylcellulose, as defined above, (2) ethylcellulose, as defined above, and (3) a solvent which is compatible with both (1) and (2). It is preferred that the ratio of component (1) to component (2) in the mixture be between about 4:1 and about 1:4 parts, respectively.

The coating composition is conveniently prepared by dissolving 4 grams of component (1) in enough of an ethanol-water mixture containing 80% by volume ethanol and 20% by volume water to make 100 ml of solution and dissolving separately 2 grams of component (2) in enough of an ethanol-water mixture containing 95% by volume ethanol and 5 % by volume water to make 100 ml of solution, then mixing together equal volumes of these two solutions to produce the coating composition. This coating composition is applied to the sodium bicarbonate leavening agent in finely divided form in a pan coater, 30 ml of the coating composition being thoroughly mixed with 100 grams of the leavening agent over a period of about one hour. The coated leavening agent is then dried at about 75°F. overnight. The resulting coated leavening agent contains about 3 percent of coating and about 97 percent of leaving agent and traces of moistue. The coated leavening agent is then mixed in dry form with other cake mix ingredients in the proper proportions to produce a cake mix compositions which, when mixed with water in the proper proportion and baked, produces a cake of acceptable specific volume as well as texture, taste, and other characteristics desired in cakes.

In general, it is preferable that the cake mix containing all of the ingredients for the preparation of a cake, including the coated sodium bicarbonate leavening agent of the present invention, have an average moisture content of less than about 5 percent when it is sealed in a substantially moisture impermeable packet or container prior to storage.

Having described the invention in general terms above, we will now proceed to illustrate the invention by means of a specific example of the coating composition for leavening agents and of a cake mix composition comprising sodium bicarbonate leavening agent coated in accordance with the invention. It will be understood, of course, that the above-described and other advantages of our invention may also be accomplished by suitable variations of the conditions, about to be set forth below, which are intended to be for illustrative purposes, and not for purposes of limiting the scope of the invention.

EXAMPLE I

A leavening agent coating composition is prepared by dissolving 4 grams of hydroxypropylmethylcellulose, manufactured and marketed by Dow Chemical Co., Midland, Mich. under the tradename "Methocel 60HG, premium", which has 7 to 12 percent 2-hydroxypropyl groups and 28 to 30 percent methoxyl groups therein and which has a viscosity of about 50 centipoises as determined by A.S.T.M. Standrd D2363-72, in enough of an ethanol-water mixture containing 80% by volume ethanol and 20% by volume water to make 100 ml of solution and dissolving 2 grams of ethylcellulose, manufactured and marketed by Dow Chemical Co., under the tradename "Ethocel", which has 5.0 to 49.5 percent ethoxyl groups therein and which has a viscosity of about 10 centipoises as determined by A.S.T.M. Standard D914-72, in enough of an ethanol-water mixture containing 95% by volume ethanol and 5% by volume water to make 100 ml of solution, then mixing together equal volumes of these two solutions to produce a coating composition for application to sodium bicarbonate leavening agent.

The coating composition is applied to powdered sodium bicarbonate by adding 30 ml of the above-described coating composition to 100 grams of bicarbonate of soda, U.S.P. in Colton laboratory model pan coater and mixing for 2 hour at room temperature. The coated sodium bicarbonate is spread out on a pan and dried overnight at 75°F. in a room at 20% or less relative humidity. The coated sodium bicarbonate is reduced to powder form again. It is found to contain about 3% of the mixture of hydroxypropylmethyl cellulose and ethylcellulose, the remainder being sodium bicarbonate.

The coated sodium bicarbonate is added to the ingredients of a yellow cake mix which is described in Interim Federal Specification N-B-0035E (Army-GL), dated March 8, 1971, entitled "Bakery Mixes, Prepared", in the proper amount to producce a cake mix having the composition given in Table 1:

TABLE 1

| Ingredient | Percent by weight |
| --- | --- |
| Sucrose | 41.00 |
| Shortening, 100 hour | 8.70 |
| Sodium aluminum phosphate | 0.50 |
| Coated monocalcium phosphate | 0.05 |
| Salt | 0.90 |
| Sodium stearoyl-2-lactylate | 0.40 |
| Mono-diglycerides | 0.90 |
| Cake flour | 40.0 |
| Dried whole eggs | 5.0 |
| Nonfat dry milk | 2.0 |
| Sodium bicarbonate | 0.55 |

Approximately 2 pounds of the cake mix are sealed in each of several No. 3 cylindrical metal cans and stored at 100°F. for different lengths of time, after each of which a can is removed from storage and the cake mix therein is converted into a cake, as described below. The specific volume of the cake is measured and the acceptability of the cake is determined by a consumer taste panel in comparison with a control cake. The contol cake in each case is made from a control cake mix comprising all of the ingredients shown in Table 1 except for the sodium bicarbonate, which is sealed in a substantially moisture impermeable packet in the proper quantity, but not coated, the packet being placed on top of the cake mix in the sealed metal can. Storage of the control cake mixes is carried out in the same manner as the experimental cake mixes containing the coated sodium bicarbonate distributed throughout the cake mix.

At the end of each storge period, the experimental cake mix is transferred from its can into a mixing bowl and stirred until all lumps have been broken up. Then 9 fluid ounces of water are added and beaten with the cake mix for 1 minute at low speed; then the mixture is beaten for 2 minutes at medium speed. Then 9 fuid ounces more of water are added and the mixture is beaten for 1 minute at low speed and 2 minutes at medium speed. The reulting cake batter is divided into three approximately one pound portions, each of which is placed in a round cake pan and baket at 350°F. for 30–35 minutes in a rotary oven, such as a Middleby-Marshall oven. One of the cakes is used to determine specific volume and the other two are used for acceptance testing.

In the case of the controls, it is necessary to remove the uncoated sodium bicarbonate from the packet in which it is sealed to keep it out of contact with the cake mix during storage thereof, then thoroughly mix the sodium bicarbonate with the cake mix prior to the addition of water and mixing of the batter in the same manner as that described above for the experimental samples of cake mix.

Baking of cakes and determinations of specific volumes of the control cakes, as well as acceptance testing of the control cakes, are carried out in the same manner as with the experimental cakes once the uncoated sodium bicarbonate is thoroughly mixed with the other cake mix ingredients.

The acceptability tests are conducted by applying a so-called "hedonic" scale method of rating the cakes by a consumer taste panel. The hedonic scale rating involves assignment by each member of the panel of a rating from 1 to 9, a rating of 1 representing "dislike extremely" and a rating of 9 representing "like extremely" while ratings in between represent various gradations between these two extremes, a rating of 5.0 being generally considered as the borderline of acceptability. The ratings given are averaged.

Specific volumes of the cakes are determined in accordance with the above-mentioned Interim Federal Specification No. N-B-0035E (Army-GL), paragraph 4.3.1.2. Specific volume is expressed in terms of milliliters per gram.

Table 2 summarizes the results of the hedonic scale ratings for cakes prepared from the cake mixes containing coated sodium bicarbonate made in accordance with the invention and for control cakes prepared from cake mixes having the same ingredients in the same porportions except having the sodium bicarbonate not coated but sealed in a packet which is substantially impervious to moisture and which is inclosed within the container in which the control cake mix is sealed. Each hedonic scale rating in Table 2 is the average of ratings given by members of a consumer taste panel of approximately 30 members. Table 2 also shows the specific volumes of the experimental cakes and the control cakes.

storage period by reason of having the sodium bicarbonate sealed in a moisture-impermeable packet.

The invention is particularly useful and advantageous in providing complete cake mixes which have good storage stability even at high temperatures and which even after storage at temperatures up to 100°F. for times as long as six months produce cakes having good specific volumes and good acceptability. It is no longer necessary to package the sodium bicarbonate leavening agent separately to prevent premature release of carbon dioxide therefrom. Also, the invention results in the distinct advantage in the production of cake mixes that a "premix" of the coated sodium bicarbonate with the acidic leavening agent can be prepared without danger of interaction of the two leavening agents. It is particularly advantageous to be able to make such a premix when relatively small quantities of the materials of the premix are required so that more uniform distribution of such materials throughout the ultimate cake mix may be obtained. Naturally, the more uniform the mixing of all of the ingredients of the cake mix, the more uniform the ultimate baked cake will be.

The leavening agent coating composition of the invention is more effective in protecting the sodium bicarbonate leavening agent from premature reaction with the acidic leavening agent than either the hydroxypropylmethylcellulose or the methyl cellulose or the ethyl cellulose used individualy as coatings for sodium bicarbonate.

It will be understood, of course, that various changes in the details and materials which have been herein described in order to explain the nature of the invention, may be made by those skilled in the art within the principle and scope of the invention.

We claim:

1. A sodium bicarbonate leavening agent coating composition comprising a mixture of (1) a cellulose ether selected from the group consisting of hydroxypropylmethylcellulose containing from about 4 to about 12 percent of 2-hydroxypropyl groups and from about 19 to about 30 percent of methoxyl groups and methylcellulose containing from about 27.5 to about 31.5 percent of methoxyl groups, (2) ethylcellulose containing from about 45.0 to about 49.5 percent of ethoxyl groups and (3) a solvent in which components

TABLE 2

| Hedonic Scale Ratings and Specific Volumes Of Cakes Prepared From Cake Mixes Stored For Various Times At 100°F. | | | | | | | |
|---|---|---|---|---|---|---|---|
| Initial | | 1 Month | | 3 Months | | 6 Months | |
| Sp. Vol. (ml/g) | Hedonic Rating | Sp. Vol. (ml/g) | Hedonic Rating | Sp. Vol. (ml/g) | Hedonic Rating | Sp. Vol. (ml/g) | Hedonic Rating |
| With coated NaHCO₃ 3.12 | 7.3 | 3.39 | 7.0 | 3.08 | 6.7 | 3.09 | 7.1 |
| Control 3.08 | 7.5 | 3.28 | 7.6 | 2.79 | 7.3 | 3.07 | 6.9 |

It is apparent from the results in Table 2 that the cake mixes prepared in accordance with the invention, i.e., containing the sodium bicarbonate leavening compositions of the invention and thoroughly distributed in the cake mix composition containing the acidic leavening agent, sodium aluminum phosphate, distributed throughout the cake mix, produce cakes having substantially as good specific volumes and acceptability as the cakes prepared from control cake mixes stored under the same conditions and which are maintained separate from the sodium bicarbonate throughout the (1) and (2) are dissolved, the ratio of component (1) to component (2) in said mixture being between about 4:1 and about 1:4 parts.

2. A sodium bicarbonate leavening agent coating composition according to claim 1, wherein said hydroxypropylmethylcellulose has a viscosity of from about 40 to about 60 centipoises, said methylcellulose has a viscosity of from about 15 to about 100 centipoises, and said ethyl cellulose has a viscosity of from about 7 to about 100 centipoises.

3. A sodium bicarbonate leavening agent coating composition according to claim 1, wherein said solvent is a mixture of ethanol and water.

4. A method of making a cake mix containing flour, other cake mix ingredients and stabilized sodium bicarbonate as a leavening agent whereby said cake mix is storage stable and capable after long-term storage of producing a baked cake which has a high specific volume which comprises the steps of (*a*) coating particles of said sodium bicarbonate leavening agent prior to the mixing of said sodium bicarbonate leavening agent with the other components of the cake mix with a composition consisting of a mixture of (1) a cellulose ether selected from the group consisting of hydroxypropylmethylcellulose containing from about 4 to about 12 percent of 2-hydroxypropyl groups and from about 19 to about 30 percent of methoxyl groups and methylcellulose containing from about 27.5 to about 31.5 percent of methoxyl groups, (2) ethylcellulose containing from about 45.0 to about 49.5 percent of ethoxyl groups, and (3) a solvent in which components (1) and (2) are dissolved, the ratio of component (1) to component (2) in said mixture being between about 4:1 and about 1:4 parts, (*b*) removing said solvent from the coated sodium bicarbonate leavening agent, and (*c*) mixing the coated sodium bicarbonate leavening agent with the other components of said cake mix in an amount sufficient to leaven said mix upon the addition of water.

5. A method of making a cake mix according to claim 4, wherein said hydroxypropylmethylcellulose has a viscosity of from about 40 to about 60 centipoises, said methylcellulose has a viscosity of from about 15 to about 100 centipoises, and said ethyl cellulose has a viscosity of from about 7 to about 100 centipoises.

6. A storage stabilized sodium bicarbonate leavening agent comprising particles of sodium bicarbonate coated with a coating comprising a mixture of (1) a cellulose ether selected from the group consisting of hydroxypropylmethylcellulose containing from about 4 to about 12 percent of 2-hydroxypropyl groups and from about 19 to about 30 percent of methoxyl groups and methylcellulose containing from about 27.5 to about 31.5 percent of methoxyl groups and (2) ethylcellulose containing from about 45.0 to about 49.5 percent of ethoxyl groups, the ratio of component (1) to component (2) in said mixture being between about 4:1 and about 1:4 parts.

7. A storage stabilized sodium bicarbonate leavening agent according to claim 6, wherein said hydroxypropylmethylcellulose has a viscosity of from about 40 to about 60 centipoises, said methylcellulose has a viscosity of from about 15 to about 100 centipoises, and said ethyl cellulose has a viscosity of from about 7 to about 100 centipoises.

8. A method of making a cake mix according to claim 4, wherein said solvent is a mixture of ethanol and water.

* * * * *